US006883418B1

(12) United States Patent
Greiner

(10) Patent No.: US 6,883,418 B1
(45) Date of Patent: Apr. 26, 2005

(54) CARBON PISTON FOR AN INTERNAL COMBUSTION ENGINE

(76) Inventor: Peter Greiner, Damooserweg 15, DE-88267 Vogt (DE)

( * ) Notice: Subject to any disclaimer, the term of this patent is extended or adjusted under 35 U.S.C. 154(b) by 0 days.

(21) Appl. No.: 09/581,581

(22) PCT Filed: Oct. 21, 1999

(86) PCT No.: PCT/DE99/03379

§ 371 (c)(1), (2), (4) Date: Jun. 14, 2000

(87) PCT Pub. No.: WO00/25012

PCT Pub. Date: May 4, 2000

(30) Foreign Application Priority Data

Oct. 22, 1998 (DE) .......................................... 198 48 649

(51) Int. Cl.[7] .................................................. F16J 1/04

(52) U.S. Cl. ........................................ 92/222; 92/169.1

(58) Field of Search .......................... 92/222, 212, 208, 92/169.1, 170.1, 171.1

(56) References Cited

U.S. PATENT DOCUMENTS

| | | | | |
|---|---|---|---|---|
| 1,467,255 A | | 9/1923 | Thomson | |
| 1,514,022 A | * | 11/1924 | Smith | 92/177 |
| 3,613,521 A | | 10/1971 | Itano | |
| 4,074,616 A | * | 2/1978 | Gale et al. | 92/222 |
| 4,140,096 A | | 2/1979 | Dunn et al. | |
| 4,297,976 A | * | 11/1981 | Bruni et al. | 123/193 CP |
| 4,450,610 A | | 5/1984 | Schaper | |
| 4,736,676 A | | 4/1988 | Taylor | |
| 4,754,731 A | * | 7/1988 | Bohm et al. | 123/193 |
| 5,054,375 A | | 10/1991 | Kawabata et al. | |
| 5,794,943 A | * | 8/1998 | Atmur et al. | 277/441 |

FOREIGN PATENT DOCUMENTS

| | | |
|---|---|---|
| DE | 1 062 486 | 7/1959 |
| DE | 2 046 862 | 3/1972 |
| DE | 27 14 484 | 10/1977 |
| DE | 27 26 273 | 12/1977 |
| DE | 29 23 934 | 12/1979 |
| DE | 29 12 786 | 5/1980 |
| DE | 3843761 | 7/1980 |
| DE | 30 36 904 | 6/1982 |

(Continued)

OTHER PUBLICATIONS

Auto Motor Sport, May 1993, Article "Kohlen–Pott", Published 1993.

Sae–Paper 950935, Published About 1995.

Daimler–Benz Employee Publication, DKF Order No. 9109 DKF 1605, Published 1994.

Auto & Technik Aug. 1993–Article "Schwartzes Gold", Published 1993.

Mahle Publication "Ausgleich Der Druck–und Temperaturdeformation...", Published About 1992.

Morgenthaler, K.D., Design und Erprobung Von Kolben Aus Feinstkornkohlenstoffen, Allegedley Dated Oct. 12, 1998.

Wahrig, G., Deutsches Worterbuch, Dated 1997.

Arndt, J. et al., for "Die Entwicklung Einer Technologie...", Date Not Identified.

TriboCeram, 'Ingenieurkeramik fur hochbeanspruchte Reibesysteme', Dipl.–Ing. M. Woydt.

*Primary Examiner*—Edward K. Look
*Assistant Examiner*—Michael Leslie
(74) *Attorney, Agent, or Firm*—Bachman & LaPointe, PC

(57) ABSTRACT

A carbon piston whose piston crown underside forms in the region between the increased-thickness boss portions independently of the surface configuration of the top side of the piston crown a curved surface, preferably an ellipsoidal surface, which adjoins the increased-thickness boss portions. The piston skirt has an axial profile in the form of a conical surface with rectilinear generatrices, which tapers upwardly to the connection to the ring portion.

25 Claims, 7 Drawing Sheets

FOREIGN PATENT DOCUMENTS

Figure 4:
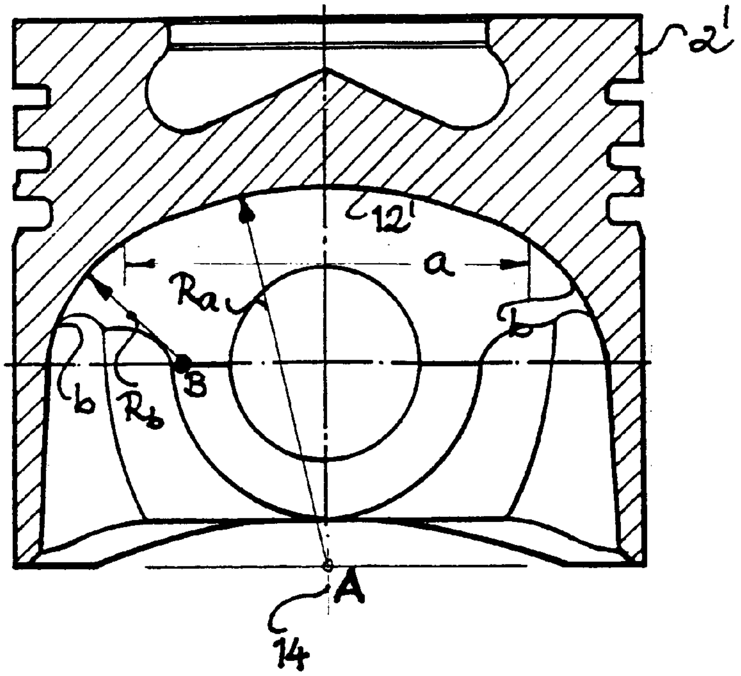

| | | | |
|---|---|---|---|
| DE | 3040125 | | 6/1982 |
| DE | 32 40 224 | | 3/1984 |
| DE | 33 01 724 | | 7/1984 |
| DE | 3406479 | | 8/1985 |
| DE | 3420571 | | 1/1986 |
| DE | 34 41 713 | | 5/1986 |
| DE | 3605918 | | 8/1986 |
| DE | 38 01 847 | | 8/1988 |
| DE | 43 26 978 | | 2/1995 |
| DE | 19547226 | | 6/1996 |
| DE | 19616474 | | 8/1997 |
| DE | 19708252 | | 9/1997 |
| DE | 19643778 | | 5/1998 |
| EP | 0420618 | | 4/1991 |
| EP | 0 695 866 | | 2/1996 |
| EP | 0752525 | | 1/1997 |
| GB | 364787 | | 1/1932 |
| GB | 2084696 | | 4/1982 |
| JP | 58-56112 | | 4/1983 |
| JP | 58-130054 | | 8/1983 |
| JP | 59-22272 | | 2/1984 |
| JP | 60-30455 | | 2/1985 |
| JP | 60-100543 | | 6/1985 |
| JP | 60-178347 | | 9/1985 |
| JP | 61-39455 | | 2/1986 |
| JP | 6-330813 | | 11/1994 |
| WO | WO 8502805 | | 7/1985 |
| WO | WO 87/05076 | * | 8/1987 |
| WO | 8705076 | | 8/1987 |

* cited by examiner

Fig. 1
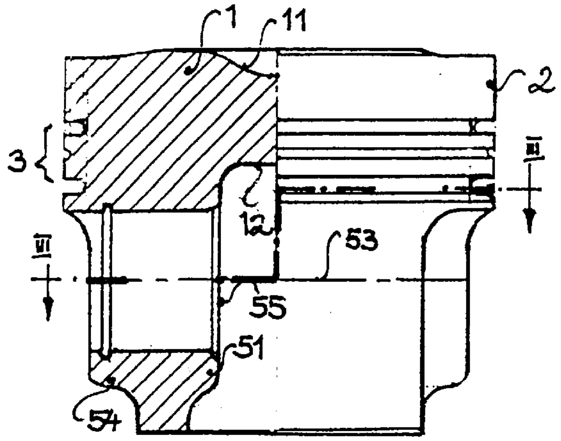
Fig. 2
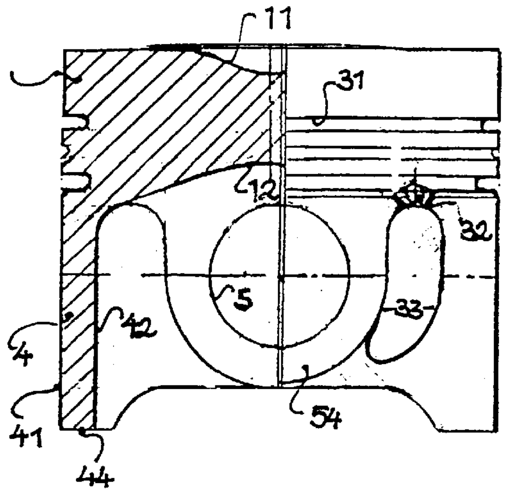
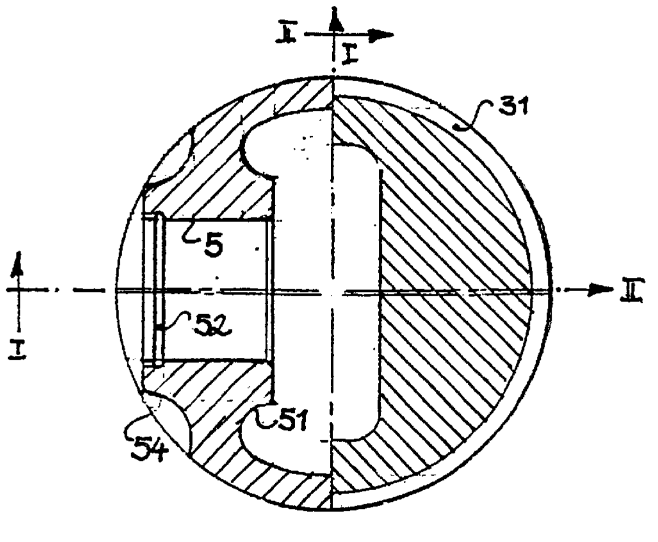
Fig. 3

CARBON PISTON FOR AN INTERNAL COMBUSTION ENGINE

DESCRIPTION

The invention concerns a piston comprising carbon, for an internal combustion engine. The invention also concerns various combinations of such a carbon piston with cylinders comprising various materials.

The rising demands on modern spark-ignition and diesel engines are necessitating inter alia the use of pistons of low mass and low structural volume. To meet such demands carbon pistons have already been proposed, comprising a modified carbon, for example pressed graphite or hard-fired carbon, with a given minimum flexural strength (EP 0 258 330 A1), or pistons comprising a graphite produced from a binder-free carbon, referred to as a mesophase. The mesophase is a raw material which as an intermediate product of liquid-phase pyrolysis derives from hydrocarbons, preferably coal- and petroleum-based pitches and polyaromatics. By means of carbonisation and graphitisation procedures those polyaromatics give rise to mesophase spherulites in a particle size in the $\mu$-range, which represent the material grains. Flexural strength levels of over 200 Mpa are attained in that way.

By virtue of the markedly lower coefficient of thermal expansion of carbon in comparison with the piston material aluminum, it is possible for the clearance between the piston and the bore surface of the cylinder to be kept substantially less. Furthermore carbon as a piston material affords advantageous emergency and cold-running properties by virtue of a certain capacity for absorbing oil and the lack of a tendency to suffer from welding (see EP 0 258 330 A1). Nonetheless it has hitherto not been possible to provide carbon pistons which are suitable for mass production, with the long service life which is required for automobiles and trucks. That is due inter alia to the fact that the thermal conductivity of carbon which is also considerably lower in comparison with aluminum means that the carbon piston in operation involves the formation of temperature fields which can differ considerably from those which are to be expected in aluminum pistons.

Therefore the object of the present invention is to propose a carbon piston for internal combustion engines, which, with the service life that is usually required, can replace mass-production aluminum pistons, in particular for automobiles and trucks, without adversely affecting the advantages which are attainable by virtue of the reduced density of carbon in comparison with aluminum and the lower level of thermal expansion thereof.

In accordance with the invention this is attained by the configurations set forth herein.

It is known in relation to aluminum pistons for the transition of the underside of the piston crown to the top land and the ring portion which carries the piston rings to be rounded in order to improve the flow of heat. In other respects however, with the intention of minimising the piston mass, the piston crown is dimensioned only from the strength point of view. That means that the thickness of the piston crown involves a usual value of 0.07 D (wherein D denotes the piston diameter) for spark-ignition engines and 0.1 D–0.25 D for diesel engines. In accordance with the invention however the design configuration of the underside of the piston crown is independent of the configuration of the top side of the piston crown, in the form of a curved or arched surface which also results in a marked accumulation of material precisely in the region between the increased-thickness portions of the boss means. The consequence of this is that in operation the piston involves a temperature field or gradient which makes it unnecessary to adopt an oval configuration for the top land and the ring portion of the piston. The options in regard to the configuration of a curved surface at the underside of the piston crown are set forth herein.

Although, as referred to above, carbons are in the meantime now available with levels of flexural strength which equal that of aluminum or even exceed it, in a development of the invention it is advantageous that the thickness of the piston crown is greater than is required for reasons of strength. Thus in accordance with the invention the above-mentioned general values for piston crown thicknesses can be between 15 and 20% higher, in other words, for spark-ignition engines at 0.084 D and for diesel engines at between 0.12 D and 0.3 D.

By virtue of the dome surface at the underside of the piston crown, the axial piston crown sag which is unequal in the case of aluminum pistons, when a pressure loading is applied, and which in the piston crown regions between the increased-thickness portions forming the boss means, that is to say transversely with respect to the axis of the piston pin, is a multiple of the sag in the region of the increased-thickness portions, can also be reduced or avoided. Besides the uneven temperature distribution, that sag phenomenon is the cause of the ovality of the piston which is necessary when aluminum pistons are involved, in particular in respect of the ring portion and the piston skirt. In the case of the carbon piston in accordance with the invention the ovality can be completely eliminated when dealing with relatively small piston diameters of up to 150 mm so that the piston is of a circular cross-section throughout and moreover can be of a markedly smaller dimension.

The configuration of the piston skirt also differs from that of aluminum pistons. Thus the cross-section of the piston according to the invention is also increased in the skirt region so that the temperature field or gradient which obtains in the piston is modified as a result of the reinforced junction of the piston skirt by way of the ring portion to the piston crown. According to the invention for that purpose the wall thickness of the piston skirt is between about 0.05D and 0.075D, preferably between about 0.56D and 0.7D. Whereas moreover in the case of aluminum pistons the axial profile of the peripheral surface of the piston skirt in the region of the boss means must be clearly crowned in order to control the different expansion characteristics in relation to the cylinder bore wall which is at a lower temperature, the carbon piston in accordance with the invention makes it possible to forego that cambered configuration. The peripheral surface of the piston skirt can therefore advantageously be in the form of a conical or tapering surface, the generatrix of which extends linearly between the connection to the ring portion and the lower edge of the skirt of the piston. Furthermore the deviation of that conical or taper surface from a cylindrical surface is considerably less than with the above-indicated profile of an aluminum piston, that is to say the diameter of the piston skirt at the junction to the ring portion is only between 0.075 and 0.8% less than the diameter at the lower edge of the piston skirt.

In principle, with the carbon piston according to the invention, it is possible for the piston rings used to be those which are also employed in connection with aluminum pistons. It is however advantageous for the carbon pistons to be used with piston rings which also consist of carbon as in that case there is no need to take account of different expansion characteristics. The above-mentioned flexural strength and the modulus of elasticity of the carbons which are available nowadays make it possible for the piston rings to be integrally formed and fitted in the same manner as is known in relation to metal piston rings. However the piston rings of carbon can be reduced in cross-section in comparison with metal piston rings by between 10 and 15% and, by virtue of the fact that their heat expansion characteristics are the same as those of the piston, the piston rings can be selected to involve considerably narrower axial clearances in the ring grooves, in relation to the groove sides. In addition the known rise in strength, increasing with rising temperature in the case of carbon, makes it possible to forego special ring support members or the like in relation to the piston ring in the ring groove which is most closely adjacent to the top land.

In order not to influence the stress and temperature field or gradient in the ring portion by virtue of bores which extend from the ring groove for accommodating the oil control ring, it is further possible to envisage providing instead of such bores in the lower side of the ring groove at least one drain opening which opens outwardly into the area around the opening of the boss means, the drain opening communicating with an oil pocket in the peripheral surface of the piston skirt. Desirably, two drain openings are provided in the ring groove on both sides of each opening in the boss means, with the drain openings being in communication with a respective pocket extending in an arcuate configuration around the respective opening in the boss means.

When carbon piston rings are used the bottom of the ring grooves may involve radii which are of the order of magnitude of between about 20% and 50% of the groove width.

The described configuration of the carbon piston according to the invention also has effects on the configuration of the boss means for accommodating the piston pin. Thus, as a departure from the known configurations for aluminum pistons, the bore for accommodating the piston pin may be of a purely cylindrical configuration because stress peaks in the bore surfaces are removed by virtue of the damping effect caused by the material employed. There is no need for additional bores to provide an oil supply to the piston pin because even in the event of the possible use of a piston pin of hardened steel or a piston pin of ceramic (silicon nitride), they afford good sliding co-operation with the carbon.

Although the above-described increases in cross-section in the carbon piston according to the invention result in an increase in mass, the carbon piston of the invention enjoys a reduction in piston mass of between 15 and 25% in comparison with aluminum pistons of the same capability. The advantage of the lower density of carbon in comparison with aluminum is therefore retained. All in all however when observing the above-described design principles the advantages of making automobile and truck pistons from carbon, being advantages which were admittedly recognised in principle but which it was hitherto not possible to implement, can be achieved. It is thus possible to arrange clearances between the piston and the co-operating cylinder bore wall surface, which are only about 30% of the clearances required for aluminum pistons. That results in reduced oil consumption and also reduced blow-by so that in turn only extremely slight carbonisation deposits and an increase in compression pressure by at least 10% in comparison with aluminum pistons are the consequences thereof. The small running clearance at the top land and the entire piston in itself means that the piston rings are subjected to a lower level of loading so that they can be expected to have a longer service life. The carbon piston in accordance with the invention can also be combined with different cylinder bore surfaces. The installation clearances to be observed for the carbon piston when in the cold condition are respectively dependent on the choice of material for the cylinder bore surface. The clearances are smaller when using cylinder bore surfaces of ceramic and they become greater when involving metal cylinder bore surfaces comprising aluminum, gray cast iron or steel. Differing heat expansion characteristics of the cylinder bore surfaces however can be substantially compensated by cooling them to a greater or lesser degree.

Figure 5:
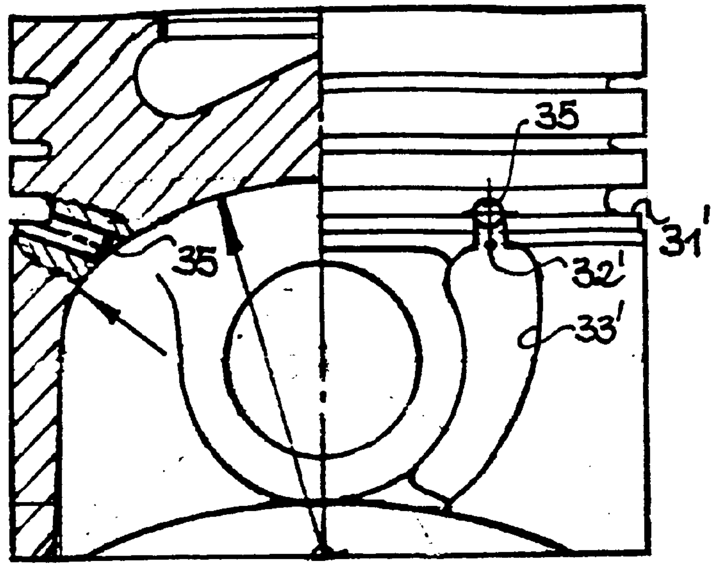
Figure 6:
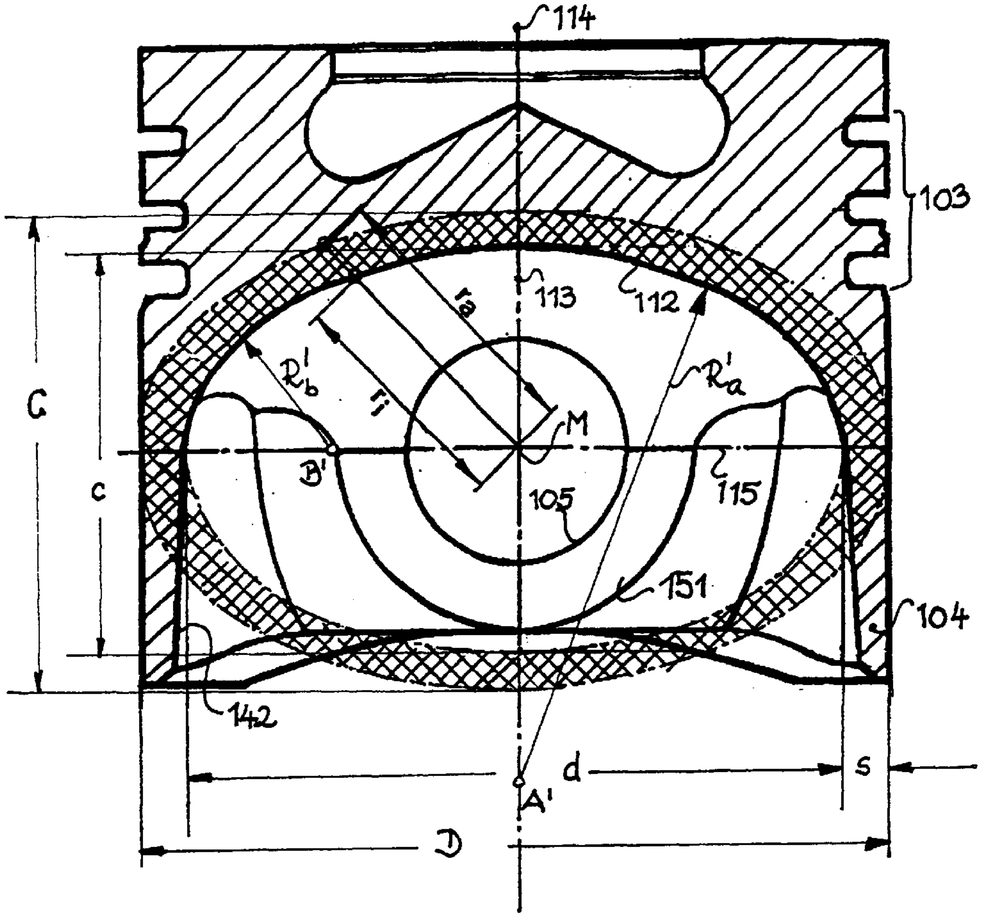
Figure 7:
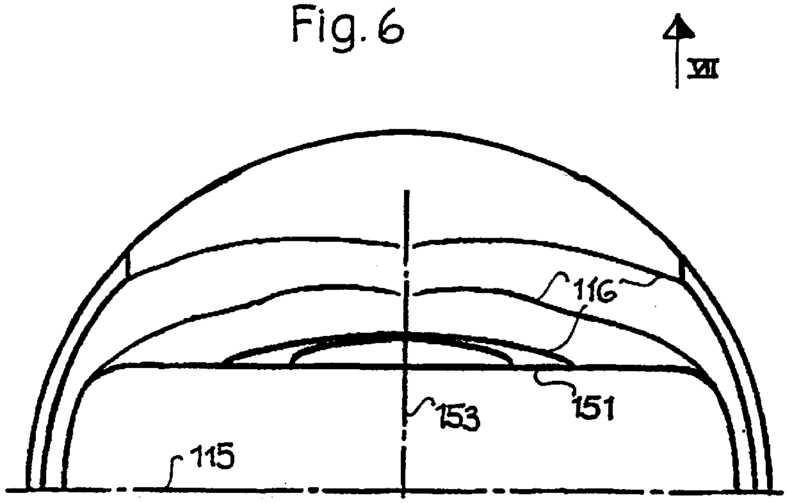
Figure 8:
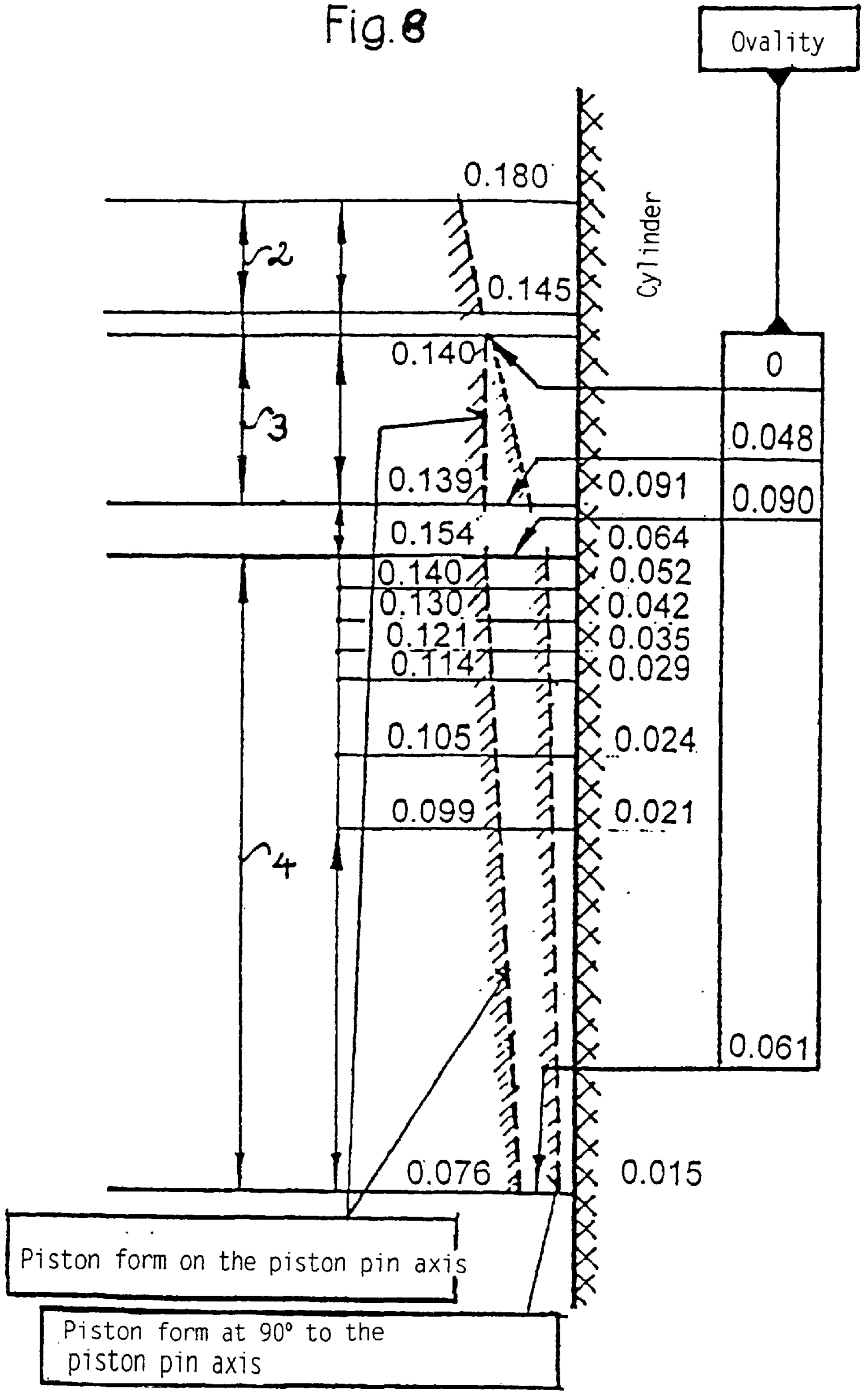
Figure 9A:
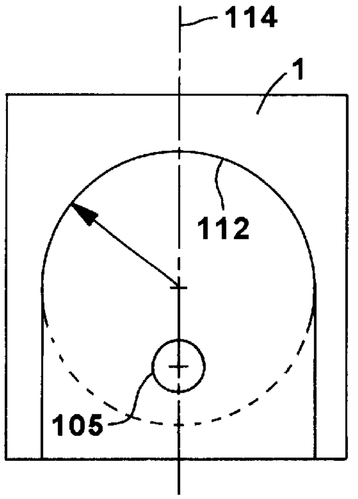
Figure 9B:
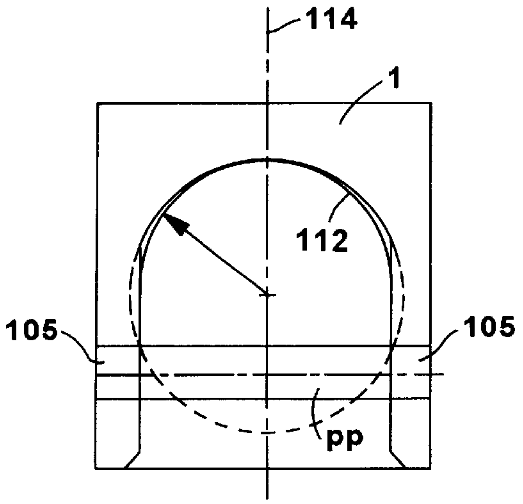
Figure 10A:
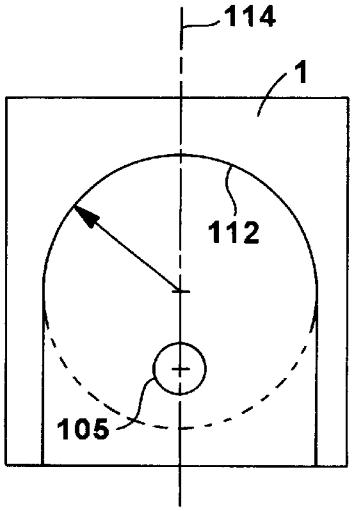
Figure 10B:
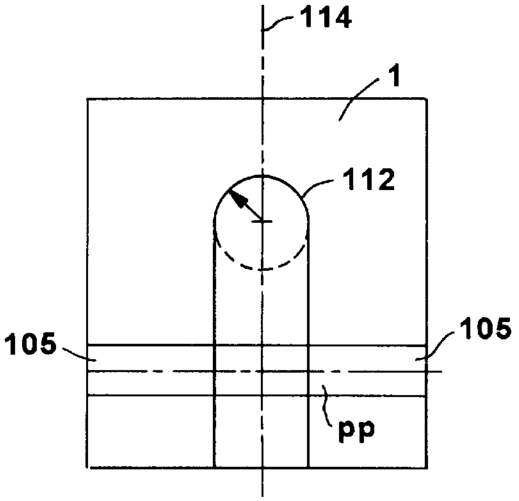
Figure 11A:
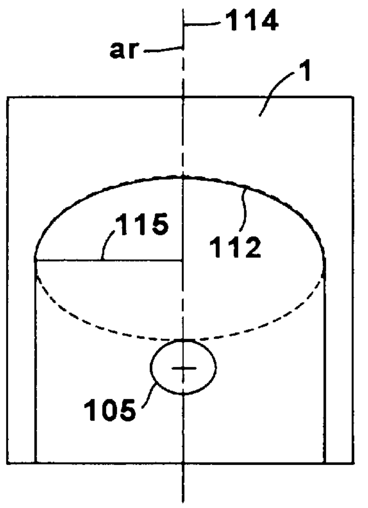
Figure 11B:
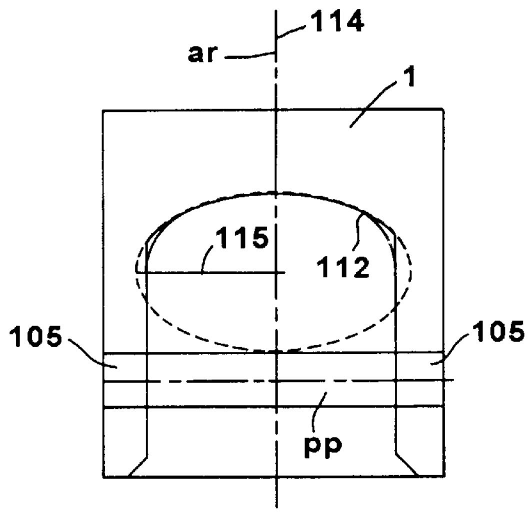
Figure 12A:
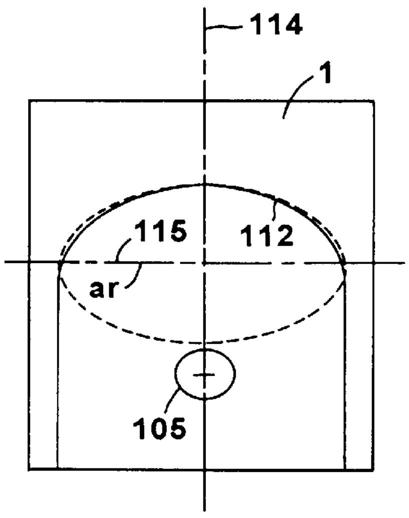
Figure 12B:
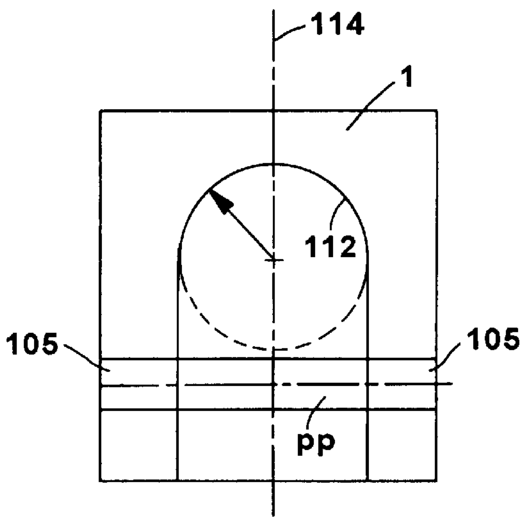
Figure 13:
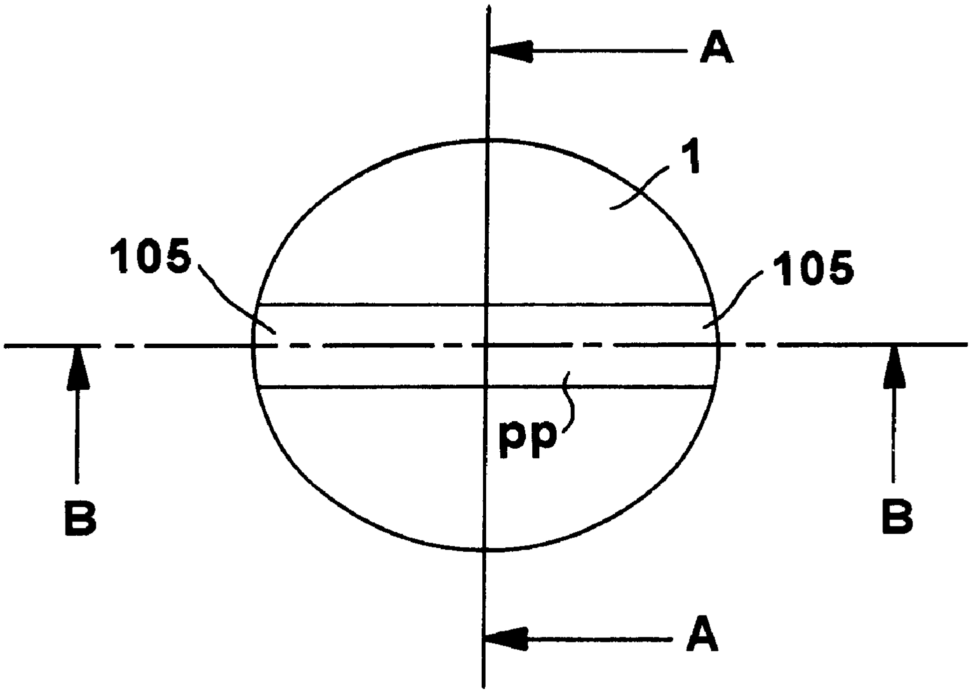

Further advantages and features of the invention will be apparent from the description hereinafter of preferred embodiments with reference to the accompanying drawings. In the drawings:

FIG. 1 is a partial section taken along line I—I in FIG. 3 and partly showing the outside surface of the piston, FIG. 2 is a partial section taken along line II—II in FIG. 3 and partly showing the outside surface of the piston, FIG. 3 is a view in section taken along line III—III in FIG. 1, FIG. 4 is a view in axial section through a further embodiment of a piston according to the invention, FIG. 5 is a view in section corresponding to FIG. 2 of a further embodiment of a piston according to the invention, FIG. 6 is an axial section similar to FIG. 4 of a further embodiment of a piston according to the invention, FIG. 7 is a partial section of the piston of FIG. 6 viewed in the direction of the arrow VII in FIG. 6, FIG. 8 shows a diagram illustrating the profile of a carbon piston crown according to the invention and the clearance thereof with respect to a cylinder bore surface, FIGS. 9*a* and 9*b* show a piston with a piston crown underside which is a spherical surface, FIGS. 10*a* and 10*b* show a piston with a piston crown underside which is a toric surface, whose axis is parallel to the axis of the boss bore, FIGS. 11*a* and 11*b* show a piston with a piston crown underside in the form of a partial surface of an ellipsoid of revolution, whose axis of revolution (ar) coincides with the axis of the piston, FIGS. 12*a* and 12*b* show a piston with a piston crown underside which is a partial surface of an ellipsoid of revolution, whose large major axis is at a right angle to the axis of the piston and forms the axis of revolution (ar), and FIG. 13 shows a portion of a piston crown and boss bore in accordance with the invention to orient the views a and b of FIGS. 9*a–b* through FIGS. 12*a–b*.

The piston shown in FIGS. 1 through 3 for a diesel engine comprises in conventional manner a piston crown 1, a top land 2, a ring portion 3 and a piston skirt 4. Formed at the top side of the piston crown 1 is a recess or basin 11. Opening at the peripheral surface 41 of the piston skirt 4 at mutually diametrally opposite positions are respective boss bores 5 in bosses formed by increased-thickness portions 51 of the inside wall 42 of the piston skirt 4, for a piston pin (not shown). Provided at the outer end of each of the boss bores 5 is a respective groove 52 for receiving a circlip (not shown) for holding the piston pin in place. The bores 5 define a transversely extending axis 53 which coincides with the axis of the piston pin.

Provided in the ring portion 3 for piston rings (not shown) are three ring grooves 31 of which the lowermost ring groove serves to receive an oil control ring. Provided in the lower side of the ring groove 31 for accommodating the oil control ring, in displaced relationship beside the bore 5 in the peripheral direction of the piston, is a drain opening 32 which communicates with a shallow oil pocket 33 in the peripheral surface of the piston skirt 4. In the proximity of the oil drain opening 32 the depth of the oil pocket 33 is for example 3 mm and the oil pocket 33 extends arcuately around and outside the increased-thickness portion 54 surrounding the bore 5 in the boss of the piston. The depth of the oil pocket 33 decreases at the lower end, tapering off to terminate at the peripheral surface 41.

As can be seen from FIG. 2, the underside 12 of the piston crown 1 forms a curved or arched surface which in the embodiment illustrated approximates to a circular-cylindrical surface whose cylinder axis (not shown) intersects the axis of the piston at a right angle. This means that the underneath surface 12 of the piston crown is formed by a straight line which is perpendicular to the plane of the drawing in FIG. 2 and it goes in a rounded configuration into the mutually opposite end faces 55 of the increased-thickness portions 51 (FIG. 1). Between the two mutually opposite increased-thickness portions 51 the underside 12 of the piston crown extends in a configuration with the radius of the circular-cylindrical surface and adjoins the inside wall 42 of the piston skirt 4 in a rounded configuration with a smaller radius. That transition extends beyond the lower end of the ring portion 3 adjoined by the piston skirt 4.

The diameter of the piston crown 1, that is to say. the piston diameter D, is 86.835 mm in the illustrated embodiment; the thickness of the piston crown 1, from the top edge of the top land 2 and without having regard to the recess or basin 11, at the apex of the underneath surface 12 of the piston crown 1, is 22 mm. The total height of the piston from the top edge of the top land 2 to the lower edge 44 of the piston skirt 4 is 76.3 mm, with the piston skirt 4 being 7.5 mm in thickness. That means that the piston crown thickness is 0.25 D, that is to say a ratio which for a diesel engine piston of this size is considerably higher than the corresponding value for an aluminum or gray cast iron piston.

FIG. 4 shows a view in longitudinal section through a carbon piston with a combustion chamber recess or basin for a direct-injection diesel engine. FIG. 4 shows that the underneath surface 12' of the piston crown represents a curved or arched surface which, unlike the embodiment shown in FIGS. 1 through 3, is not a circular-cylindrical surface practically continuously as far as the inside wall surface of the piston, but is composed of three circular-cylindrical surface portions, as considered transversely with respect to the axis of the piston pin. Thus, the predominant portion a is of a radius $R_a$, the center point A of which is on the axis 14 of the piston. The other two mutually opposite surface portions b which are symmetrical with respect to the central plane of the piston which is on the axis of the piston pin are on the other hand of a radius $R_b$ whose center point B is on a transverse axis which intersects the axis of the piston pin. It will be appreciated that the surface portions b, perpendicularly to the plane of the drawing in FIG. 4, are of a shorter extent than the central surface portion a because they have to blend with a transitional radius into the inside wall of the piston skirt.

In the region of the top land 2' the piston as shown in FIG. 4 is of a diameter of 68.87 mm. In this case the radii $R_a$ and $R_b$ are 41 and 12 mm respectively.

The embodiment of the piston as shown in FIG. 5 approximately corresponds in size and configuration to that shown in FIG. 4. It differs therefrom and from the embodiment of FIGS. 1 through 3 in that, in addition to the drain opening 32' in the lower side of the ring groove 31', the piston has a plurality of drain bores 35 which lead into the interior of the piston. The drain bores 35 promote the discharge of oil through the outer oil pocket 33'.

The piston shown in FIGS. 6 and 7, like that shown in FIG. 4, has a combustion chamber recess or basin at the top side of the piston crown and is also intended for a direct-injection diesel engine. However the general discussion set out hereinafter applies irrespective of the configuration of the top side of the piston crown and thus is also applicable in regard to a flat top side. Unlike the embodiment shown in FIG. 4 the underneath surface 112 of the piston crown forms part of the surface of an ellipsoid of revolution, the axis of rotation 113 of which coincides with the axis 114 of the piston. The large major axis 115 of the ellipsoid extends at a right angle to the axis 114 of the piston and at the same time also at a right angle to the axis 153 (FIG. 7) of the bore 105 in the boss means, which at the same time is the axis of the piston pin (not shown). In addition, in the illustrated embodiment the large major axis 115 intersects the axis 153 of the bore 105 in the boss means and at the same time the axis 114 of the piston. That means that the center point M of the ellipsoid of revolution coincides with the point of intersection of the axis 114 of the piston and the axis 153 and the surface portion forming the underside 113 of the piston crown thus substantially corresponds to half the part-spherical surface of the ellipsoid.

For a practical situation the partial surface referred to herein of the ellipsoid of revolution can be approximated by the surface of a spherical portion having the radius $R'_a$, which is adjoined at the two ends of the large major axis 115 by the respective surface of half a spherical portion having the radius $R'_b$. The center point A' for the radius $R'_a$ lies on the axis 114 of the piston; the center point B' for the radii $R'_b$ is disposed respectively on the large major axis 115. The radius $R'_a$ which substantially determines the surface configuration of the underside 112 of the piston crown can be calculated in accordance with the following formula:

$$R'_a = r_{i\,min} + d/2$$

wherein $r_i$ denotes the spacing of the center point M from the underside 112 of the piston crown; $r_{i\,min}$ is thus the smallest spacing of the center point M from the underside of the piston crown, measured along the axis 114 of the piston, and d denotes the diameter of the inside wall 142 of the piston skirt 104 at the height of the large major axis 115, equivalent here to the height of the axis 153 of the bore 105 in the boss means.

Based on measurement of the thickness of the piston crown in the measurement range referred to in the opening part of this specification of between 0.12 D and 0.3 D (D=nominal piston diameter) and the dimension of the skirt wall thickness s in the measurement range referred to in the opening part of this specification of between 0.05 D and 0.075 D, it is possible to determine in each case the position of the center point A' on the axis 114 of the piston and the position of the center points B' on the major axes 115. In regard to the dimension of the piston crown thickness it must additionally be borne in mind in this respect that the lowermost ring groove in the ring portion 103 is sufficiently far above the curved underside of the piston crown in order not to have an adverse effect on the flow of heat and forces by virtue of a reduction in cross-section at that location. The transitions between the partial spherical surfaces produced in that way are smoothed by transitional surfaces in relation to the surface of an ellipsoid of revolution. In this embodiment the underneath surface 112 of the piston crown extends in the direction of the axis 153 of the bore 105 of the boss means over a shorter distance than transversely thereto because, in the region of the increased-thickened boss portions 151, it is necessary to take account of the fact that there is still sufficient space for the connecting rod eye. The transitions to the increased-thickness boss portions 151 are rounded in each case.

The radius for the curved surface which determines the underside 112 of the piston crown can also be estimated or established by the approximate value $R'_a$=KD with K=0.5–0.75.

Thus the internal contour of the piston crown in the piston according to the invention differs markedly from the internal contour of conventional aluminum pistons in which the piston crown is of a substantially plate-shaped configuration and is rounded only in the transition to the top land and to the ring portion which carries the piston rings. As a consequence thereof, in regard to strength calculation of the piston crown of carbon pistons according to the invention which are relatively highly loaded (for example the piston of FIG. 6) the moments of resistance of the piston crown are approximated in accordance with the moments of resistance of hollow elliptical bodies with a constant hollow ratio and are calculated by the following formula:

$$W=\pi/32\cdot CD^2(1-\alpha^4),$$

wherein $$\alpha=c/C=d/D=r_i r_a=\text{const.}$$

In the illustrated embodiment $r_{a\ max}$=D/2. In FIG. 6 the elliptical hollow body which forms the basis for that calculation is illustrated by cross hatching.

In the case of pistons according to the invention which are relatively slightly loaded, for example for spark-ignition engines, both the piston crown thickness and also the piston skirt wall thickness s can be selected to lie at the lower limit of the specified dimensional ranges. In this case, for calculating the moment of resistance of the piston crown, it is possible to make use of calculation of the moment of resistance of hollow-elliptical bodies with a constant wall thickness by virtue of the simplified formula:

$$W\approx 0.2\ sD(D+3C)$$

The above-described procedure for ascertaining the surface configuration of the underside 112 of the piston crown and the procedure for calculating the moment of resistance in that respect can be transferred without noticeable errors to an underneath surface of a piston crown, which forms part of the surface of a cylinder of elliptical cross-section. The axis of that cylinder is at a right angle to the axis 114 of the piston and coincides with the axis 153 of the bore 105 in the boss means, that is to say the generatrices of the cylinder are perpendicular to the plane of the drawing in FIG. 6. The large major axis 115 of the elliptical cross-section of that cylinder is in turn at a right angle to the axis 114 of the piston and also the axis 153 (see FIG. 6). In this case the piston requires in the region of the end points of the major axis 115 more extensive transitional surfaces into the inside wall 142 which is of a substantially circular-cylindrical configuration at the transition to the skirt 104.

In FIG. 7 the transitional surfaces are only qualitatively indicated by height lines 116 which are afforded by cross-sections transversely with respect to the axis 114 of the piston.

A corresponding consideration applies if the underside of the piston crown is formed by the partial surface of an ellipsoid of revolution whose axial section affords the same image as the ellipsoid of revolution shown in FIG. 6, but which has the large major axis 115 as the axis of revolution. In this case also the center point of the ellipsoid of revolution is at the point of intersection M between the axis 114 of the piston and the axis 153 of the bore 105 of the boss means. This configuration affords between the increased-thickness boss portions 115 a curved surface which only slightly requires a rounded configuration into the increased-thickness boss portions, but which affords in the region of the two ends of the large major axis 115 greater wall thicknesses for the skirt 104.

In the case of carbon pistons it is possible substantially to forego a de-axing configuration which is frequently implemented in the case of aluminum pistons, that is to say a displacement of the axis of the piston pin with respect to the axis of the piston. If nonetheless de-axing is appropriate the extent thereof is still less than that of aluminum pistons. The above-described embodiments illustrated in FIGS. 4, 5 and 6 do not involve a de-axing effect. Therefore in the embodiment shown in FIG. 6 in which the underside of the piston crown is formed by a partial surface of an ellipsoid of revolution, the center point M thereof lies also on the axis of the bore of the boss means. If however the piston is designed with a de-axing configuration, then that center point M is only on the axis of the piston at the level of the axis of the bore in the boss means, which in this case crosses the axis of the piston.

FIGS. 9_a–b_, 10_a–b_, 11_a–b_, 12_a–b_ and 13 illustrate alternative embodiments of the underside of the piston crown in accordance with the present invention.

In all the above-described embodiments there is theoretically between the substantially circular-cylindrical inside wall of the piston and the curved surface forming the underside of the piston crown an intersection edge which in practice is avoided by transitional radii or rounded portions.

FIG. 8 shows the grinding pattern of a carbon piston according to the invention with a diameter D of 100 mm, showing the profile of the top land 2, the ring portion 3 and the piston skirt 4 and the local clearances thereof in relation to a cylinder bore surface comprising gray cast iron. With a piston of that size, even when it is made from carbon, it is possible to consider an ovality which affords a greater clearance in the region of the boss bores 5 and a smaller clearance in the regions which are transverse with respect to the axis 53 of the boss bores. The numerical values show however that both the clearances and also the ovality are only about 0.3-times the corresponding values when considering an aluminum piston.

It is a matter of significance that the profile shown in broken line of the piston skirt, extending from the lower edge of the ring portion 3, extends substantially rectilinearly to the lower edge 44 of the piston skirt, that is to say it involves a conical or tapering surface without the camber configuration required in the case of aluminum pistons. It can further be seen that, with this carbon piston, by virtue of the higher levels of thermal loading to be expected, the top land 2 does not have a cylindrical but a tapering outside surface. However the piston does not involve any ovality whatsoever in its region.

The above-specified numerical values are in principle correspondingly lower in the event of a pairing of piston/cylinder when using a carbon piston than when a pairing with an aluminum piston is involved. Nonetheless the values involved change in dependence on whether the cylinder bore surface is formed by gray cast iron or by other materials. Thus the cylinder may have light-metal bore surfaces comprising aluminum, magnesium and the like which in known manner carry a nickel coating with a high proportion of silicon carbide, known by the marks NIKASIL or ELNISIL. It is also possible for the bore surfaces to have purely ceramic coatings. Finally, the cylinder may also have cylinder sleeves or cylinder bore surfaces comprising composite materials which are made up of metal/ceramic and which are known for example under the marks ALUSIL, LOKASIL and SILITEC. When the cylinder bore surface is formed from those materials which thus differ from gray cast iron, the installation clearance of the piston in the cold condition is between 0.010 and 0.035% of the piston diameter, in which respect that value is established transversely with respect to the axis of the piston pin if the piston already involves an ovality by virtue of the piston size.

What is claimed is:

1. A piston for an internal combustion engine, which comprises carbon having a piston crown, a top land axially adjoining the piston crown, a ring portion and a piston skirt having a boss bore for receiving a piston pin, wherein the piston skirt wall has increased-thickness portions in mutually opposite relationship on the inside of the piston skirt to form the boss and which extend into the underside of the piston crown with a rounded configuration, wherein in the region between the increased-thickness boss portions independently of the surface configuration of the top side of the piston crown the underside of the piston crown forms a curved surface with a curvature which is directed transversely with respect to the axis of the boss bore, wherein the underside of the piston crown is in a form selected from the group consisting of a dome surface in the form of a part-spherical surface, a toric surface whose axis is parallel to the axis of the boss bore, a partial surface of an ellipsoid of revolution whose large major axis is at a right angle to the axis of the piston and whose axis of revolution coincides with the axis of the piston, and a partial surface of an ellipsoid of revolution whose large major axis is at a right angle to the axis of the piston, and to the axis of the boss bore and forms the axis of revolution.

2. A piston as set forth in claim 1, wherein the underside of the piston crown forms a dome surface in the form of a part-spherical surface.

3. A piston as set forth in claim 1, wherein the underside of the piston crown forms a toric surface whose axis is parallel to the axis of the boss bore.

4. A piston as set forth in claim 1, wherein the underside of the piston crown forms a partial surface of an ellipsoid of revolution whose large major axis is at a right angle to the axis of the piston and whose axis of revolution coincides with the axis of the piston.

5. A piston as set forth in claim 4, wherein the large major axis of the ellipsoid of revolution contains the point of intersection between the axis of the piston and the axis of the boss bore.

6. A piston as set forth in claim 1, wherein the underside of the piston crown forms a partial surface of an ellipsoid of revolution whose large major axis is at a right angle to the axis of the piston and to the axis of the boss bore and forms the axis of revolution.

7. A piston as set forth in claim 6, wherein the axis of revolution contains the point of intersection between the axis of the piston and the axis of the boss bore.

8. A piston as set forth in claim 1, wherein the surface of the underside of the piston crown goes tangentially into the mutually facing flat end faces of the increased-thickness boss portions.

9. A piston as set forth in claim 1, wherein the surface of the underside of the piston crown forms an intersection with the mutually facing flat end faces of the increased-thickness boss portions and the intersection is rounded.

10. A piston as set forth in claim 1, wherein the top land has a circular-cylindrical outside surface.

11. A piston as set forth in claim 1, wherein the top land has a circular-conical surface as its outside surface.

12. A piston as set forth in claim 1, wherein the envelope surface of the outside surfaces of the ring portion for piston diameters of up to 150 mm is a circular-cylindrical surface.

13. A piston as set forth in claim 1, wherein the peripheral surface of the piston skirt as far as the ring portion is an upwardly tapering surface with a substantially rectilinear contour.

14. A piston as set forth in claim 13, wherein the tapering surface is of an oval cross-section such that the diameter in a direction in transverse relationship to the axis of the boss bore is larger by between 0.04 and 0.09% than in a direction in the axis of the boss bore.

15. A piston-cylinder combination as set forth in claim 14, wherein with a piston having ovality the installation clearance is established transversely with respect to the axis of the piston pin.

16. A piston as set forth in claim 1, wherein the lower edge of a groove for receiving an oil control ring has in the ring portion at least at one side of the mutually opposite boss openings a drain opening which opens into an oil pocket in the peripheral surface of the piston skirt.

17. A piston as set forth in claim 16, wherein a drain opening and an oil pocket are provided on both sides beside each boss opening.

18. A piston as set forth in claim 17, wherein the oil pockets extend arcuately around the boss opening.

19. A piston in combination with a cylinder using a carbon piston as set forth in claim 1, wherein the cylinder has a bore surface of gray cast iron and the installation clearance of the piston in the cold condition is between 0.015 and 0.65% of the piston diameter.

20. A piston in combination with a cylinder using a carbon piston as set forth in claim 1, wherein the cylinder has a bore surface of light metal of one of aluminum and magnesium and the installation clearance of the piston in the cold condition is between 0.010 and 0.35% of the piston diameter.

21. A piston-cylinder combination as set forth in claim 20, wherein the light metal bore surface has a coating with nickel with a high proportion of silicon carbide or a ceramic coating.

22. A piston-cylinder combination as set forth in claim 20, wherein the light metal bore surface is formed by a cylinder sleeve comprising a light metal/ceramic composite.

23. A piston-cylinder combination as set forth in claim 20, wherein the light metal has a nickel coating with a high proportion of silicon carbide.

24. A piston in combination with a cylinder using a carbon piston as set forth in claim 1, wherein the cylinder has a ceramic bore surface and the installation clearance of the piston in the cold condition is between 0.010 and 0.35% of the piston diameter.

25. A piston as set forth in claim 1, wherein said carbon is a graphite produced by means of a carbon mesophase.

* * * * *